United States Patent [19]

Tanaka

[11] Patent Number: 5,156,901
[45] Date of Patent: Oct. 20, 1992

[54] CORRUGATED CARDBOARD STRUCTURE

[75] Inventor: Tomoji Tanaka, Karasuma, Japan

[73] Assignee: Terry Kunimune, Glendale, Calif. ; a part interest

[21] Appl. No.: 565,426

[22] Filed: Aug. 10, 1990

[30] Foreign Application Priority Data

Mar. 23, 1990 [JP] Japan .................................. 29924

[51] Int. Cl.[5] .......................... B32B 3/28; B65D 90/04
[52] U.S. Cl. .................................... 428/182; 428/34.2; 220/440; 220/441; 220/670; 229/90; 229/93; 229/100; 138/121; 138/173
[58] Field of Search ...................... 428/182, 184, 34.1, 428/34.2, 179, 535, 537.5, 542.8; 220/441, 670, 440; 138/121, 173; 229/90, 93, 100

[56] References Cited

U.S. PATENT DOCUMENTS 2,314,876  3/1943  Greene ................................ 428/184

FOREIGN PATENT DOCUMENTS 2504043  8/1976  Fed. Rep. of Germany ...... 428/184

Primary Examiner—Ellis P. Robinson
Assistant Examiner—Donald J. Loney
Attorney, Agent, or Firm—Erik M. Arnhem

[57] ABSTRACT

A corrugated cardboard structure for use in wrapping of goods during shipment. A core cardboard of wave shape is glued to at least one cardboard surface sheet at crests of the waves of the core cardboard, with at least one non-glued portion of the cardboard surface sheet adjacent to one of the crests being between two glued portions. The corrugated cardboard structure of the invention can be formed into an open-ended hollow tubular configuration for placement around goods during shipment of the goods. Alternatively, the cardboard structure can be formed into a rectangular box for containment of goods during shipment or storage of the goods.

4 Claims, 3 Drawing Sheets

CORRUGATED CARDBOARD STRUCTURE

The invention is in the field of corrugated cardboard structures as used in wrapping materials for electronic appliances and the like.

BACKGROUND OF THE INVENTION

FIG. 4 of the attached drawings shows the structure of corrugated cardboard of the prior art used as wrapping materials, etc. FIG. 4(a) is a plan view and FIG. 4(b) is the cross-section view of IV—IV of FIG. 4(a) The core cardboard (12) has a plurality of corrugations of waveshape (13) and on both sides of the core cardboard (12) has liner cardboard (14) which are glued to the crest portions of the corrugations (13). In some cases a liner cardboard (14) is only glued to one side of the core cardboard (12). The former is called two-side corrugated cardboard and the latter is called one-side corrugated cardboard. The material use for the core cardboard (12) and the liner cardboard (14) is pulp. The gap between the core cardboard (12) and the liner cardboard (14) is empty space (15). The corrugated cardboard having the structure described above is used as a wrapping material for electric appliances, etc., and serves the purposes of protecting goods as a cushion material from external shocks during shipping.

However, there is a problem or difficulty in wrapping around goods with the two-side corrugated cardboard. Since the corrugations (13) are glued to both liner cardboard (14) it is difficult for either (14) to expand and shrink, when the corrugated cardboard is wrapped around an item, e.g. item 17 shown in FIG. 5. The inner liner cardboard (14) having a smaller bending radius has difficulty in bending in a circular shape between the corrugations (13) and thus tends to form a polygon shape bending at several places as shown in FIG. 5. For this reason, the corrugated cardboard (11) forms a gap with a goods (17) so that the goods (17) tends to drop from the corrugated cardboard (11).

SUMMARY OF THE INVENTION

One object of the invention is to avoid the problem described above of the liner cardboard being unable to expand and shrink when wrapped around goods.

A further object of the invention is to make it possible to totally wrap goods around with the two-side corrugated cardboard without a gap and thus enhance the cushion effect.

BRIEF DESCRIPTION OF THE DRAWING FIGURES

DETAILED DESCRIPTION OF THE PREFERRED EMBODIMENT

Figure 1A:
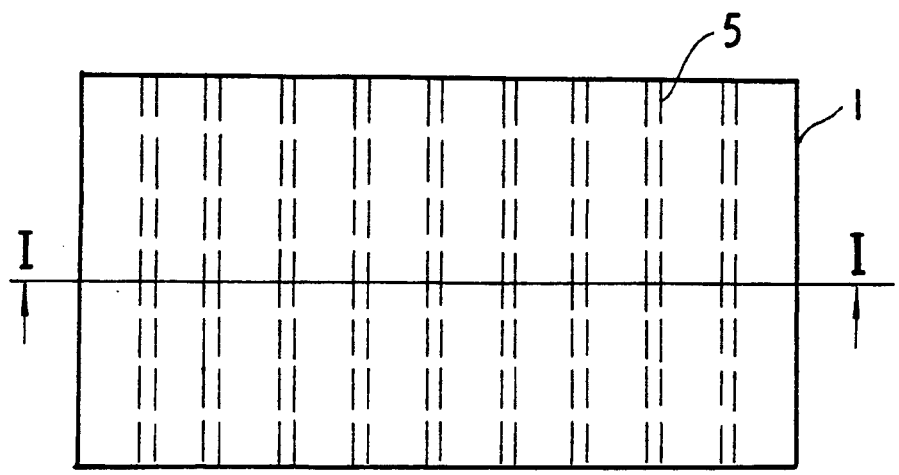
FIG. 1(a) shows the structure of the corrugated cardboard of the present invention in plan view.
Figure 1B:
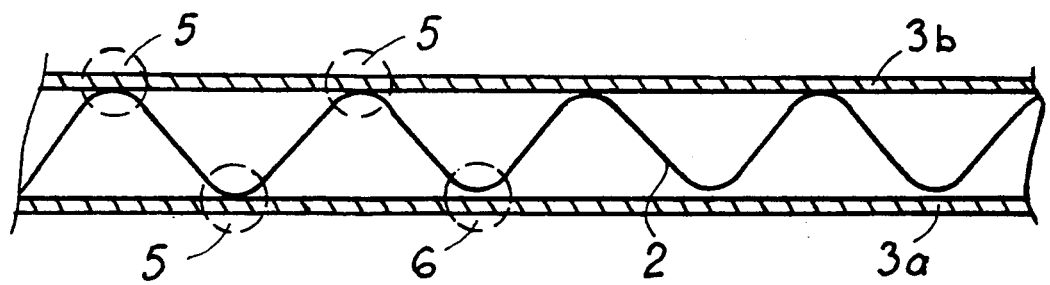
FIG. 1(b) shows the structure of the corrugated cardboard of the present invention in cross-sectional view.

An embodiment of this invention will be explained in the following:

FIG. 1 is a drawing which shows the structure of corrugated cardboard of this invention. FIG. 1(a) is a plan view and FIG. 1(b) is the cross-sectional view I—I of FIG. 1(a).

This corrugated cardboard (1) is a two-side corrugated cardboard which has a core cardboard paper sheet (2), and paper sheets (3a) and (3b) on either face of the core sheet. The core cardboard (2) whose material is semi-chemical pulp, etc., has a plurality of corrugations of waveshape (4). The surface sheets (3a) and (3b) whose material is kraft pulp, etc., are placed on both sides of the core cardboard (2). The surface cardboard sheet (3a) has glued portions (5) with the crests of the corrugations (4) and the surface cardboard sheet (3b) has glued portions at every three crests of the corrugations, i.e., having one glued portion (5) and then two non-glued portions (6) and so on.

As shown in FIGS. 1a and 1b, core sheet 2 is continuously corrugated along its entire transverse dimension, with each corrugation having a common corrugation length and a common corrugation amplitude. Successive corrugations have crests facing in opposite directions, with alternate crests being glued to facing sheet 3a, and the intervening crests being engaged with facing sheet 3b. As indicated above, every third one of the intervening crests is glued to sheet 3b. Each sheet 2, 3a or 3b is formed of paper that is inherently flexible but non-elastic. The three ply corrugated paper sheet structure formed by the corrugating and gluing operations has a selective bending capability that enables it to be smoothly curved around goods for protective purposes during shipment of the goods, as shown generally in FIG. 2 of the drawings.

Figure 2:
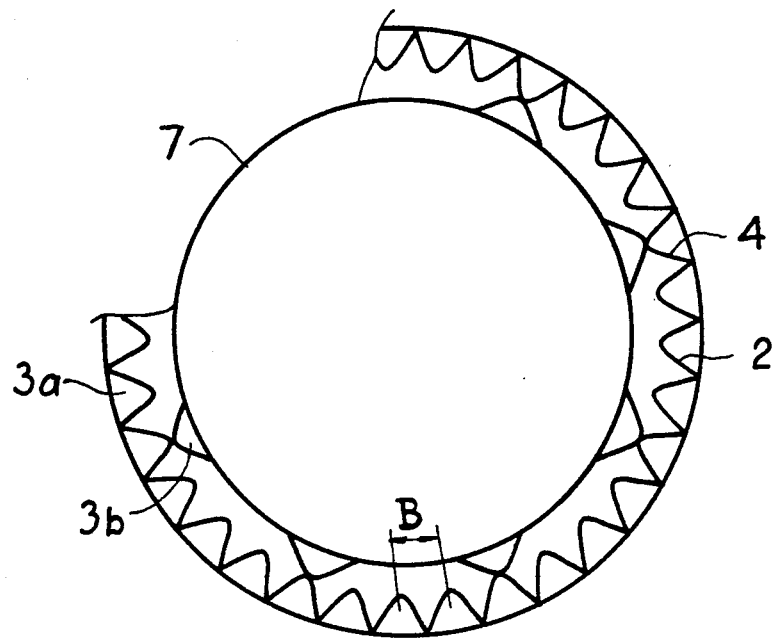
FIG. 2 shows the corrugated cardboard of the present invention wrapped around goods in side view.
Figure 3:
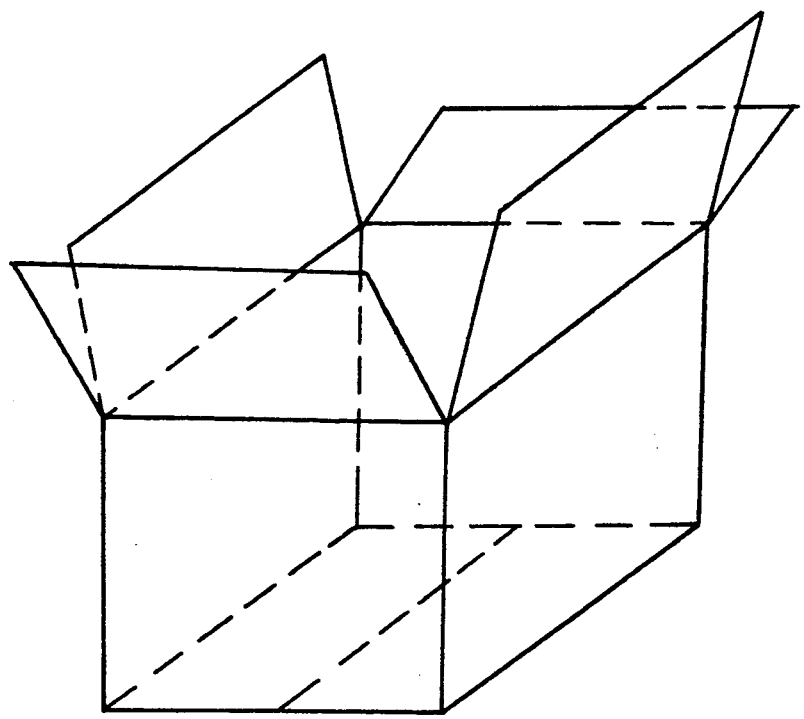
FIG. 3 is a diagonal view of another example of using the corrugated cardboard of the present invention.
Figure 4A:
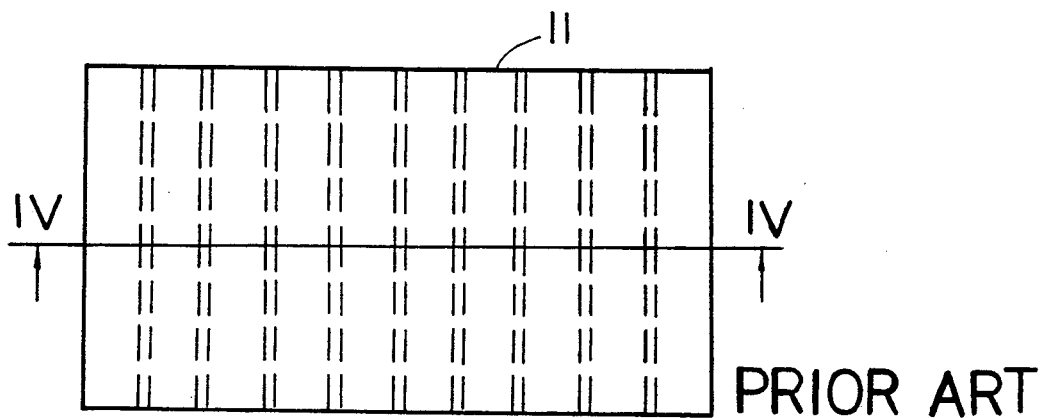
FIG. 4(a) is a plan view of the structure of conventional corrugated cardboard.
Figure 4B:
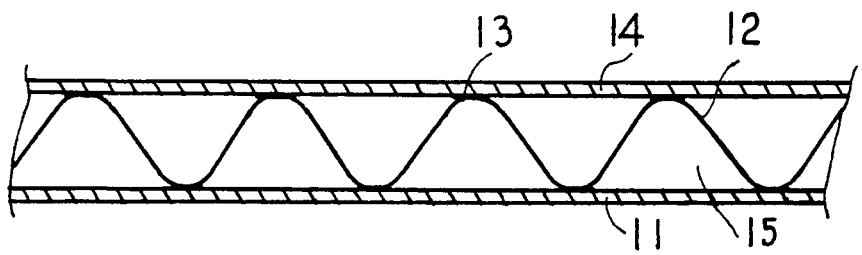
FIG. 4(b) is a cross-sectional view of the conventional corrugated cardboard of FIG. 4(a).
Figure 5:
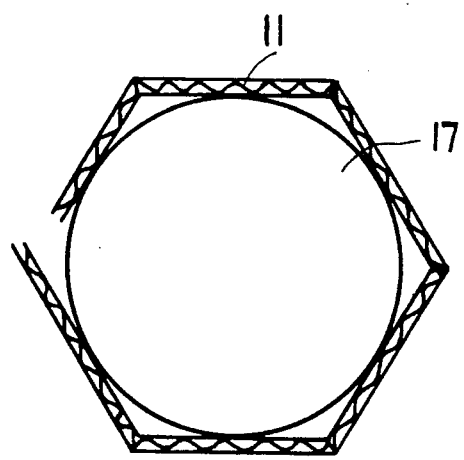
FIG. 5 is a side view of the conventional corrugated cardboard wrapped around goods.

FIG. 2 shows how the corrugated cardboard (1) constructed in the way described above is wrapped around a goods (7) with the cardboard (3a) placed outward. Since the cardboard (3a) on the outside is hard, does not expand or shrink easily and is difficult to bend between two corrugations (4), it tends to bend at the crests of the corrugations (4), forming a polygon shape. On the inside, the distance B between the corrugations (4) not glued to the cardboard (3b) shrinks and the cardboard (3b) bends to form a circular shape internally between the glued portions (5) with the crest portions compressed due to contact with the goods (7). With the corrugated cardboard (1) wrapped around, circular bending force is added to the portion of the cardboard (3b) not glued to the corrugations (4), having elasticity which works as a cushion to the goods (7). Therefore, external shock applied is reduced through the cardboard (3b), thus providing a damping effect which protects the goods (7).

In this embodiment, two (2) non-glued portions (6) are used between the glued portions (5) of the cardboard (3b). However, the number of the non-glued portions (6) should not be limited to two (2), but may be one (1) or more than two (2).

The corrugated cardboard of this invention is not only used for wrapping goods as described above but also for any purposes of the conventional corrugated cardboard. For example, it is used as a normal wrapping material for a container box of type A, etc.

As has been explained above, the corrugated cardboard of this invention having cardboards on both sides thereof can be located around goods in a circular shape with the inner cardboard having a cushion effect which supports the goods, protecting the goods from external shocks and thus achieving the intended goal.

I claim:

1. A corrugated multi-ply paper sheet structure, comprising: a flexible non-elastic paper core sheet; said core sheet being continuously corrugated therealong, with each corrugation having a common corrugation length and a common corrugation amplitude; successive corrugations in said core sheet forming crests facing in opposite directions, with alternate crests facing in a first direction, and intervening crests facing in a second direction; a first flat non-corrugated surface sheet of flexible non-elastic paper glued to all of said alternate crests; a second flat non-corrugated surface sheet of flexible non-elastic paper glued to only selected ones of the intervening crests; the non-glued crests being evenly spaced whereby the corrugated sheet structure can be concavely bent at any non-glued crest without stressing the corrugated sheet structure.

2. The corrugated sheet structure of claim 1, wherein every third one of the intervening crests is a glued crest.

3. The corrugated sheet structure of claim 1, wherein said sheet structure is formed into a hollow open-ended tubular configuration adapted to be wrapped around goods during shipment of the goods; the second surface sheet constituting the inner surface of the tubular configuration, and the first surface sheet constituting the outer surface of the tubular configuration.

4. The corrugated sheet structure of claim 1, wherein said sheet structure is formed into a hollow rectangular box adapted to contain goods during shipment of the goods; the second surface sheet constituting the inner surface of the box, and the first surface sheet constituting the outer surface of the box.

* * * * *